United States Patent
Wang et al.

(10) Patent No.: US 7,760,483 B2
(45) Date of Patent: Jul. 20, 2010

(54) METHOD AND DEVICE OF COMPOUND ACTIVE AND PASSIVE PLASMA FOR LIGHTNING PROTECTION

(75) Inventors: Kunsheng Wang, Kunming (CN); Xiaobin Li, Kunming (CN)

(73) Assignee: Kunsheng Wang, Yunnan (CN)

(*) Notice: Subject to any disclaimer, the term of this patent is extended or adjusted under 35 U.S.C. 154(b) by 649 days.

(21) Appl. No.: 11/547,178

(22) PCT Filed: Jan. 27, 2005

(86) PCT No.: PCT/CN2005/000116
§ 371 (c)(1),
(2), (4) Date: Aug. 9, 2007

(87) PCT Pub. No.: WO2005/093920
PCT Pub. Date: Oct. 6, 2005

(65) Prior Publication Data
US 2008/0043399 A1    Feb. 21, 2008

(30) Foreign Application Priority Data
Mar. 29, 2004    (CN) .................. 2004 1 0022185

(51) Int. Cl.
*H01C 7/12* (2006.01)

(52) U.S. Cl. ............................ 361/220; 361/118
(58) Field of Classification Search ................. 361/117, 361/120, 118, 212, 220
See application file for complete search history.

(56) References Cited

U.S. PATENT DOCUMENTS

| | | | | |
|---|---|---|---|---|
| 5,987,335 A * | 11/1999 | Knoedl et al. | ............... | 455/561 |
| 6,012,330 A * | 1/2000 | Palmer | ................ | 73/170.24 |
| 6,072,684 A * | 6/2000 | Eybert-Berard et al. | ..... | 361/212 |
| 6,804,106 B2 * | 10/2004 | Zhuang | ................ | 361/230 |

* cited by examiner

Primary Examiner—Danny Nguyen
(74) Attorney, Agent, or Firm—Weaver Austin Villeneuve & Sampson LLP

(57) ABSTRACT

A lightning protection method and device with compound actively generated plasma and passively produced plasma provide lightning protection without the need for grounding of the protected object. The device has lightning rods with a plasma piping inside. The high density plasma generated by an active plasma generator is blown through the piping, spread out at the tips of the rods and compounded with the plasma passively produced by the corona discharge on the tips under the action of lightning cloud electric field. The compound plasma dissipates the electric charges, on the tips of the rods, inducted by the lightning cloud electric field, and neutralizes the electric charges of the lightning, preventing a thunderstruck to a protected object related to the rods.

10 Claims, 1 Drawing Sheet

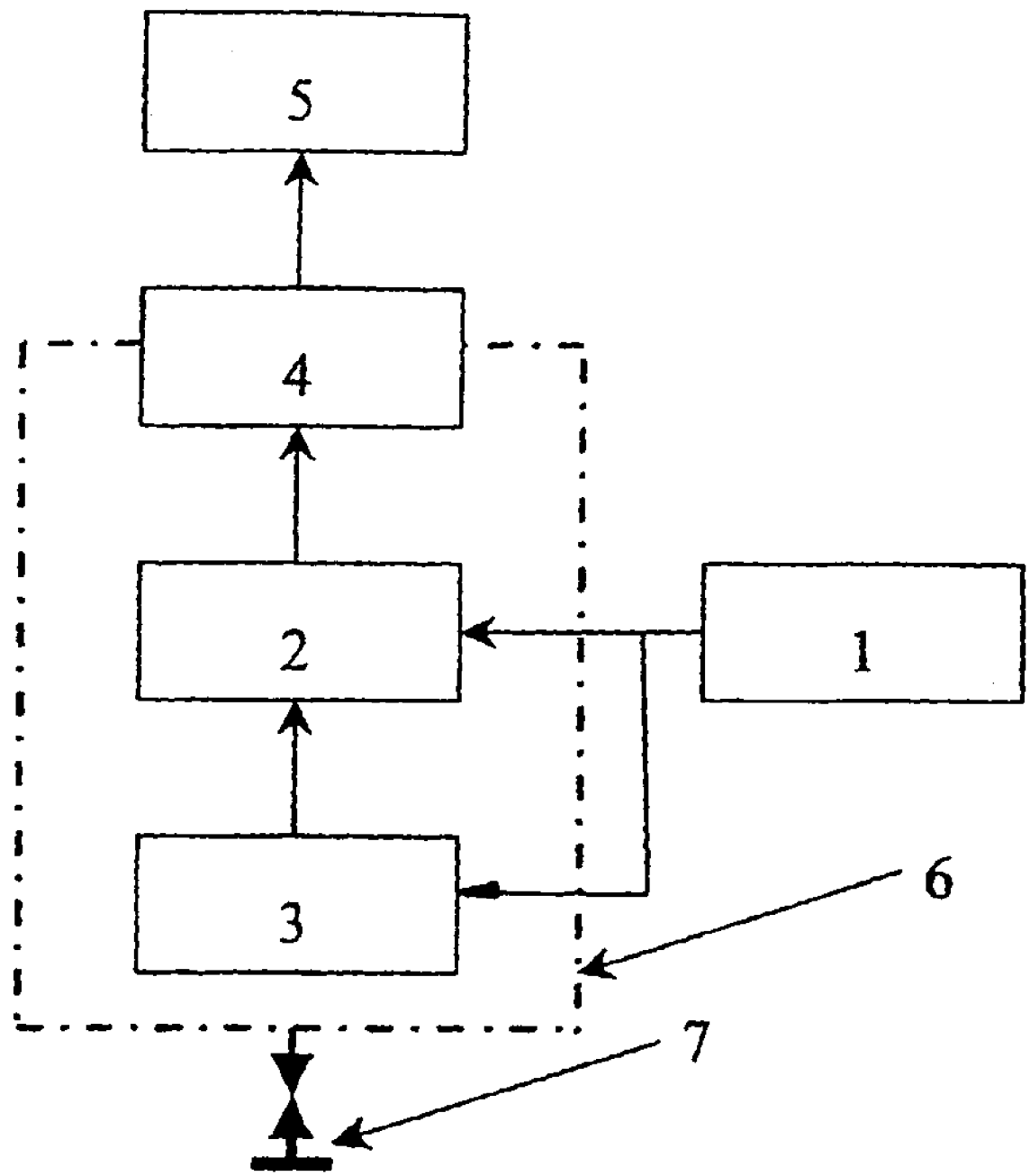

METHOD AND DEVICE OF COMPOUND ACTIVE AND PASSIVE PLASMA FOR LIGHTNING PROTECTION

TECHNICAL FIELD

The invention relates to the technical field of lightning protection and specifically relates a lightning protection method and its device with compound actively generated plasma and passively produced plasma.

BACKGROUND TECHNIQUE

In lightning protection field, lightning rod has been continued to use for more than 250 years, since it was invented by American Benjamin Franklin. According to the basic operation principle of the lightning rod, its functions are as follows:

1. Attracts and discharges lightning with the tip of the rod, above the protected object.

2. Discharges lightning current into grounding conductor via conducting wire.

Besides lightning rod, lightning belt, lightning rod network and earlier discharge lightning rod etc. all function on the basic operation principle of lightning rod.

To avoid the protected object from direct voltage puncture, lightning rod discharges lightning current and then reduces electric field strength. But as lightning current is discharged by lightning rod into ground, it produces some harmful phenomena, such as stronger LEMP (Lightning Electromagnetic Pulse), induction overvoltage, back flashover, contact voltage and step voltage. They caused some damages to objects, especially modern electronic device and network.

In the end of 1970's of the twentieth century, based on the technology of the lighting rod with single tip derived some array lightning eliminators (LE) with multi-tip. It is expected that with the plasma produced by the corona discharge on the multi-tip under the action of lightning cloud electric field, the charges, on the tips inducted by lightning cloud electric field can be dissipated, lightning cloud charges can be neutralized and electric field strength in around space can be reduced. Then the lightning voltage puncture to the pins can be shielded and eliminated.

Although the lightning eliminators achieved some success in application, their corona discharge current on the multi-pin is still too smaller and is only about 600 µA in total. So that, the plasma formed by the discharge current is not enough in density and general capacity and often fail in lightning elimination when the conditions of lightning cloud, electric field strength and direction etc. are not suitable for lightning elimination.

PUBLICATION OF THE INVENTION

The invention is a lightning protection method with compound actively generated plasma and passively produced plasma. The high density plasma generated artificially by an active plasma generator is compounded with the plasma passively produced by the corona discharge on the tips of single or multi lightning rod. In this case, the density and capacity of plasma are highly increased, and the functions of the plasma as good electrical conductor at gaseous state are greatly strengthened to reduce and shield the electric field of lightning cloud and then to realize lightning elimination and lightning protection for the protected object within the protection scope.

The invention and its device effectively solved the problems and disadvantageous of the conventional lightning rods and lightning eliminators as well as took their good points.

For concreteness, the aim of the invention with the following procedure is to provide a lightning protection method and its device with compound actively generated plasma and passively produced plasma.

a) When strength of lightning cloud electric field is detected, by lightning fore-alarming signal unit, up to alarming limitation, the unit sends signal to start active plasma generation unit and air flowing source unit.

b) Air flowing source unit transports air or other gases suited for ionization to active plasma generation unit and via plasma piping in each lightning rod blows out the high density plasma generated by active plasma generation unit, at the tips of lightning rod unit.

c) Single or multi-tips of lightning rod unit under the action of lightning cloud electric field passively produces plasma. When the tips of lightning rods are covered by electrical insulator layer, their corona discharge can be strengthened and voltage puncture can be suppressed.

d) Actively generated plasma and passively produced plasma are compounded at the tips of lightning rod unit and spread to around space.

As plasma acted as good electrical conductor at gaseous state, it dissipates the electric charges, on the tips of the rods, inducted by lightning cloud electrical field, and neutralizes the electric charges of lightning cloud. Then the electric field strength in around space can be reduced and the lightning cloud voltage puncture to the rods can be eliminated. As a result, the thunderstruck to the protected object within the protection scope related to the rods can be rejected.

e) Active plasma generation unit and air flowing source unit are covered by metal shielded cover to protect the two units from outside electromagnetic interference.

f) According to this method, the lightning rods of the device do not need to be grounded for lightning protection, but it is compatible to ground each lightning rod via a gap, if it is required.

Another aim of the invention is to provide a lightning protection device with compound actively generated plasma and passively produced plasma. The device includes: lightning rod unit; active plasma generation unit; air flowing source unit; lightning fore-alarming signal unit. The characteristics of the device are as follows:

Lightning fore alarming signal unit is connected with active plasma generation unit and air flowing source unit, and controls the two units to start or stop. Air flowing source unit is connected with active plasma generation unit and transports air or other gases suited for ionization to the active plasma generation unit. Lightning rod unit is consisted of single rod or multi rod each with a plasma piping inside. Active plasma generation unit is connected with lightning rod unit. The plasma passively produced by corona discharge on single or multi tip of lightning cloud electric field is compounded with the high density plasma generated by using artificial active electric field to ionize air or other suitable gases. Active plasma and passive plasma are compounded and spread out at the tips of lightning rods.

Using the characteristic of plasma as good electrical conductor at gaseous state, the compound plasma dissipates the electric charges, on the tips of the rods, inducted by lightning cloud electric field, and neutralizes the electric charges of lightning cloud. Then the electric field strength in around space can be reduced, and the lightning cloud voltage puncture to lightning rods can be shielded and eliminated. As a result, the thunderstruck to the protected object within the protection scope related to the lightning rods of the device can be rejected.

When strength of lightning cloud electric field above protected object is detected, by lightning fore-alarming signal unit, up to alarming limitation, the unit sends signal to start active plasma generation unit and air flowing source unit. Air flowing source unit operates and draws air of atmosphere or other suitable gases and transports them to active plasma generation unit to be ionized and then formed high density plasma. Via plasma piping within lightning rods, air flowing source unit blows high density plasma out at the tips of lightning rods.

When the tips of single or multi lightning rods are covered by electrical insulator layer, under the action of lightning cloud electric field, their corona discharge can be strengthened, more plasma can be produced and the lightning cloud voltage puncture to lightning rods can be suppressed more effectively.

To protect the safe and reliable operation of the units in the device, active plasma generation unit and air flowing source unit are covered by spherical metal shielded cover or other covers with suitable forms. The shielded cover is connected with grounding system to form good grounded shielding protection for active plasma generation unit and air flowing source unit. Single or multi lightning rod of the device do not need to be grounded for lightning protection, but it is compatible to ground each lightning rod via a gap, if this is required.

Compared with other current lightning protection methods and devices, the method and device with compound active and passive plasma for lightning protection which are disclosed in the invention have the following advantages.

1. In the invention, compound active and passive plasma is used for lightning rejection or elimination and does not need to discharge lightning current to ground. In the invention the following advantages of current single or multi lightning rod are used for reference.

To attract lightning, lightning rod is set above the protected object some distance. Array lightning eliminator produces passive plasma to reduce lightning voltage puncture and then protects the protected object from thunderstruck within its protection scope.

As well as, the invention solved the following problems of them. Such as, discharge lightning current with lightning rod to ground to cause many damages.

For array lightning eliminator, its passive plasma is not enough in density and general capacity, and then its lightning voltage puncture probability is higher.

2. In applications of the invented device, if it is asked to ground the lightning rods of the device, to meet the requirement, the lightning rods of the device are compatible to be grounded via a gap and then the device provides multi operation ways for lightning protection and become easily accepted in engineering application.

3. As a key unit of the device, active plasma generator is simple and reliable in structure, light, small in volume, cost less and energy save. The power of the plasma generator is about 600 W and the generator only start to operate during lightning fore-alarming limitation signal is acted. Average period for rejecting each lightning with the device is about 2 hr and energy consumption is only 1.2 kWh. The density of the plasma actively generated is up to $10^{15}/m^3$. As the device is with the cost about the same as that of array lightning eliminator and energy save in operation, and actively generates high density plasma by economically using the air of atmosphere, it has excellent advantages in performance and economy.

4. As the surface area of high density plasma is very large, when it is spread to the space, it forms a larger plasma expanding volume around the device to avoid lightning cloud discharge to the side part of lightning rods. So that the device is suitable to be applicated in different topographies and positions.

5. As the device does not need to discharge lightning current to ground, it can be applied in lightning protections of ungrounded moving objects and objects in the area with higher earth resistance rate.

BRIEF INSTRUCTION OF ATTACHED DIAGRAM

Diagram 1 is the operation principle block-diagram of the invention.

OPTIMUM WAY TO REALIZE THE INVENTION

Refer to the attached diagram, the invention will be further clarified as follows.

When the strength of the lightning cloud electric field above the protected object is detected, by lightning fore-alarming signal unit, up to alarming limitation, unit 1 sends signal to start active plasma generation unit 2 and air flowing source unit 3. Air flowing source unit 3 operates and transports air or other gases suited for ionization to active plasma generation unit 2 and via plasma piping in each lightning rod blows out the high density plasma, generated by active plasma generation unit, at the tips of single or multi lightning rod unit 4.

The plasma passively produced by corona discharge on single or multi tip of lightning rods 4 under the action of lightning cloud electrical field is compounded with the high density plasma generated by using artificial active electrical field to ionize air or other suitable gases. Active plasma and passive plasma are compounded and spread out at the tips of lightning rods. Using the characteristic of plasma as good electrical conductor at gaseous state, the compound plasma dissipates the electric charges, on the tips of the rods, induced by lightning cloud electric field, and neutralizes the electric charges of lightning cloud. Then the electric field strength in around space can be reduced, and the lightning cloud voltage puncture to lightning rods can be shielded and eliminated. As a result, the thunderstruck to the protected object within the protection scope related to the lightning rods of the device can be rejected.

The tips of signal or multi lightning rods can be covered by electrical insulator layer 5, then their corona discharge can be strengthened and lightning cloud voltage puncture to lightning rods can be suppressed more effectively.

To protect the save and reliable operation of the units in the device, active plasma generation unit 2 and air flowing source unit 3 are covered by spherical metal shielded cover 6 or other covers with suitable forms. The shielded cover is connected with grounding system to form good grounded shielding protection for active plasma generation unit 2 and air flowing source unit 3. When the grounding system is needed only for shielding cover grounding, grounding system 7 can use the grounding conductor with the current carrying level much less than the level for lightning current discharge and the grounding system 7 need to be fully insulated from lightning rods 4.

When the lightning rods 4 are needed to be connected via a gap to ground system 7 and to discharge lightning current, the ground system 7 should has the current carrying level for lightning current discharge.

INDUSTRIAL APPLICATION

In the invention, the following advantages of current single or multi lightning rod are used for reference. To attract lightning, lightning rod is set above the protected object some distance. Array lightning eliminator produces passive plasma to reduce lightning voltage puncture and protects the protected object from thunderstruck within its protection scope. As well as, the invention solved the following problems of them.

Such as, discharge lightning current with lightning rod to ground to cause many damages. For array lightning eliminator, its passive plasma is not enough in density and general capacity, and then its lightning voltage puncture probability is higher.

In the invention, active plasma and passive plasma are compounded for lightning rejection and it does not need to discharge lightning current to ground and then avoids many damages caused by discharging current to ground.

As the surface area of high density plasma is very large, when it is spread to the space, it forms a larger plasma expanding volume around the device to avoid lightning cloud discharge to the side part of lightning rods. So that the device is suitable for application in different topographies and positions. As the device does not need to discharge lightning current to ground, it can be applied in lightning protections of ungrounded moving objects and objects in the area with higher earth resistance rate.

The invention claimed is:

1. A lightning protection method of compound active and passive plasma, the method comprising steps of:
    detecting a strength of a lightning cloud electrical field, by a lightning fore-alarming signal unit, when it reaches to a pre-determined limitation;
    sending a signal to start an active plasma generation unit, and an air flowing source unit;
    transporting air or other suited gases to the active plasma generation unit by the air flowing source unit via a plasma piping in each lightning rod to blow out a high density plasma generated by the active generation unit at the tips of the lightning rod unit;
    under the action of the lightning electric field, passively forming corona discharge and producing a plasma by single or multi-tips of the lightning rod unit;
    compounding the active generated plasma and the passively produced plasma at the tips of the lightning rod unit and spreading it to around a space;
    as the plasma acted as good electrical conductor at gaseous state, dissipating the electric charges on the tips of the rods induced by the lightning cloud electrical field;
    neutralizing the electric charges of the lightning cloud;
    reducing the electrical field strength in around the space;
    eliminating the lightning cloud voltage punctured to the rods; and
    preventing a thunderstruck to a protected object related to the rods.

2. The method of claim 1, wherein
the single or multi-tips of lightning rod unit (4) under the action of lightning cloud electric field passively produce plasma, the tips of lightning rod unit (4) are covered by an electrical insulator layer (5), such that their corona discharge can be strengthened and voltage puncture can be suppressed.

3. The method of claim 1, wherein the
active plasma generation unit (2) and the air flowing source unit (3) are covered by the metal shielded cover (6) to protect the two units from outside electromagnetic interference.

4. The method of claim 1, wherein the lightning rods (4) of the device are not grounded for lightning protection.

5. A device of compound active and passive plasma for lightning protection comprising:
    a lightning rod unit (4), an active plasma generation unit (2), an air flowing source unit (3) and a lightning fore-alarming signal unit (1), wherein the lightning fore-alarming signal unit (1) is connected to the active plasma generation unit (2) and the air flowing source unit (3), and controls the two units (2) and (3) to start or stop; the air flowing source unit (3) is connected with the active plasma generation unit (2) and transports air or other gases suited for ionization to the unit (2); the lightning rod unit (4) comprises a single or multi rod each with plasma piping inside, and the lightning rod unit (4) is connected with the active plasma generation unit (2).

6. The device of claim 5, wherein the lightning rod unit (4) is covered by an electrical insulator layer (5).

7. The device of claim 5, wherein the active plasma generation unit (2) and the air flowing source unit (3) are covered by a metal shielded cover (6).

8. The device of claim 5, wherein the lightening rod unit (4) is ungrounded.

9. The method of claim 1, wherein the lightning rods (4) of the device are grounded for lightning protection to ground unit (7) via a gap.

10. The device of claim 5, wherein the lightning rod unit (4) is grounded via a gap to ground unit (7).

* * * * *